United States Patent
Han et al.

(10) Patent No.: US 10,199,167 B2
(45) Date of Patent: Feb. 5, 2019

(54) THIN-FILM CERAMIC CAPACITOR

(71) Applicant: SAMSUNG ELECTRO-MECHANICS CO., LTD., Suwon-si, Gyeonggi-do (KR)

(72) Inventors: Seung Hun Han, Suwon-si (KR); Sung Min Cho, Suwon-si (KR); Tae Joon Park, Suwon-si (KR); Hyun Ho Shin, Suwon-si (KR); Sang Kee Yoon, Suwon-si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 15/642,025

(22) Filed: Jul. 5, 2017

(65) Prior Publication Data

US 2018/0144866 A1    May 24, 2018

(30) Foreign Application Priority Data

Nov. 18, 2016    (KR) .......... 10-2016-0154276

(51) Int. Cl.
  *H01G 4/30*   (2006.01)
  *H01G 4/005*  (2006.01)
  *H01G 4/06*   (2006.01)
  *H01G 4/232*  (2006.01)

(52) U.S. Cl.
  CPC .......... *H01G 4/232* (2013.01); *H01G 4/306* (2013.01)

(58) Field of Classification Search
  CPC .......... H01G 4/33; H01G 4/306; H01G 4/005; H01G 4/06; H01G 4/232
  USPC .......... 361/301.4, 303, 306.1, 306.3, 321.2; 216/13
  See application file for complete search history.

(56) References Cited

U.S. PATENT DOCUMENTS

| | | | |
|---|---|---|---|
| 2008/0186654 A1* | 8/2008 | Takeshima | H01G 4/232 361/313 |
| 2010/0252527 A1 | 10/2010 | Takeshima et al. | |
| 2013/0194714 A1* | 8/2013 | Nakaiso | H01L 23/5223 361/301.2 |
| 2016/0071651 A1* | 3/2016 | Kurosawa | H01G 4/228 361/304 |

FOREIGN PATENT DOCUMENTS

| | | |
|---|---|---|
| JP | 2014-090077 A | 5/2014 |
| JP | 2015-070058 A | 4/2015 |
| WO | 2009/078225 A1 | 6/2009 |

* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

A thin-film ceramic capacitor includes a body, a plurality of dielectric layers and first and second electrode layers alternately disposed on a substrate in the body, first and second electrode pads disposed on an external surface of the body, and a plurality of vias disposed in the body, the plurality of dielectric layers and first and second electrode layers having inclined etched surfaces exposed to the plurality of vias, a first via, of the plurality of vias, being connected to the inclined surface of the first electrode layer, and a second via, of the plurality of vias, being connected to the inclined surface of the second electrode layer.

13 Claims, 12 Drawing Sheets

THIN-FILM CERAMIC CAPACITOR

CROSS-REFERENCE TO RELATED APPLICATION(S)

This application claims the benefit of priority to Korean Patent Application No. 10-2016-0154276 filed on Nov. 18, 2016 with the Korean Intellectual Property Office, the disclosure of which is incorporated herein by reference in its entirety.

TECHNICAL FIELD

The present disclosure relates to a thin-film ceramic capacitor.

BACKGROUND

Recently, portable information technology (IT) products such as smartphones, wearable devices, and the like, have been thinned, or produced with increasingly thin dimension. Therefore, the demand of thinning a passive element in order to decrease an overall thickness of a package has increased.

To this end, demand for a thin-film ceramic capacitor capable of implementing a reduced thickness of a package, as compared to a multilayer ceramic capacitor, has also increased.

Meanwhile, in a capacitor product manufactured using thin film technology, a method of forming vias for connections between an external electrode and an electrode layer and between electrode layers may be important. Performance of the thin-film ceramic capacitor is affected by the method of forming the vias as described above and a final structure of the vias.

In a method of manufacturing a thin-film ceramic capacitor according to the related art, at the time of forming vias after repeatedly stacking dielectric layers and electrode layers, one via is required in one electrode layer, and there is provided a method of forming a larger number of vias as compared to the number of electrode layers.

In addition, as a patterning method at the time of stacking the electrode layers, there is provided a method of stacking even-numbered electrode layers and odd-numbered electrode layers in different forms and etching one side surfaces so as to expose only even- or odd-numbered electrode layers and then connecting electrodes to each other.

However, these methods have problems in that processes are complicated, and manufacturing costs may be increased, such that a technology capable of easily manufacturing a more thinned thin-film ceramic capacitor is required.

Meanwhile, at the time of manufacturing the thin-film ceramic capacitor, after forming a plurality of dielectric layers and electrodes, there is a need to form and connect vias in order to connect upper and lower electrodes to each other. In this case, when an area of the via is increased, capacitance of the dielectric layer is decreased in accordance with the increase in the area of the via, and as a size of the via is increased, a problem such as a limitation in design, for example, disposition of the electrodes, or the like, may occur.

Further, in order to connect vias in respective layers to each other, the etching should be performed several times up to an electrode layer, such that process cost may increase.

SUMMARY

An aspect of the present disclosure may provide a high-capacitance thin-film ceramic capacitor having excellent reliability and a small size.

According to an aspect of the present disclosure, a thin-film ceramic capacitor may include: a body in which a plurality of dielectric layers and first and second electrode layers are alternately disposed on a substrate; and first and second electrode pads disposed on an external surface of the body, wherein a plurality of vias are disposed in the body and the plurality of dielectric layers and first and second electrode layers have inclined etched surfaces exposed to the plurality of vias, among the plurality of vias, a first via being connected to the inclined surface of the first electrode layer, and among the plurality of vias, a second via being connected to the inclined surface of the second electrode layer.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Hereinafter, a thin-film ceramic capacitor according to the present disclosure will be described.

Figure 1:
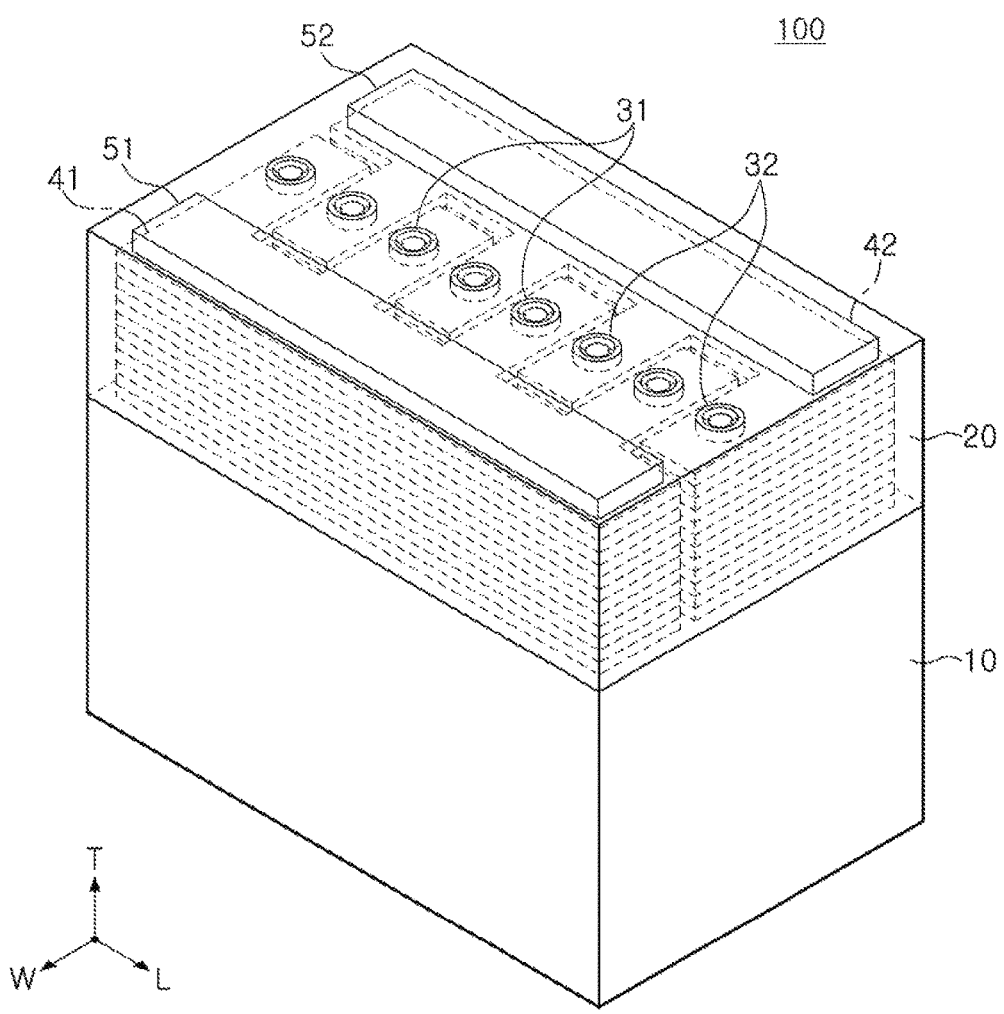
FIG. 1 is a perspective view of a thin-film ceramic capacitor according to exemplary embodiments of the present disclosure.
Figure 2:
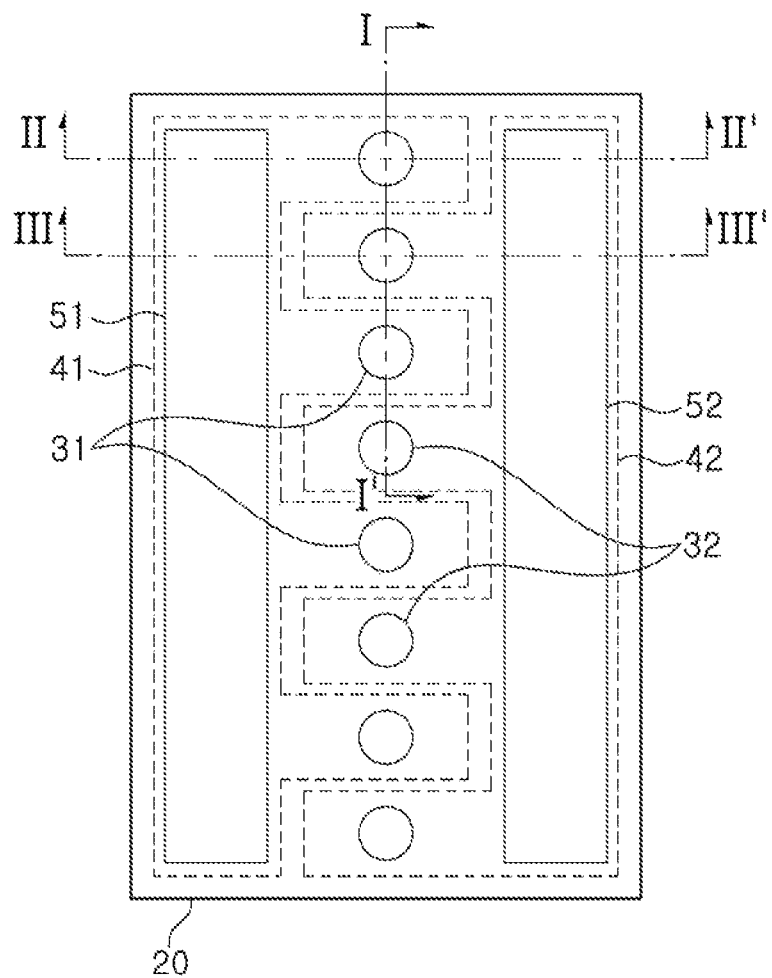
FIG. 2 is a plan view of the thin-film ceramic capacitor of FIG. 1.

FIG. 1 is a perspective view of a thin-film ceramic capacitor according to exemplary embodiments of the present disclosure, and FIG. 2 is a plan view of the thin-film ceramic capacitor of FIG. 1.

Figure 3:
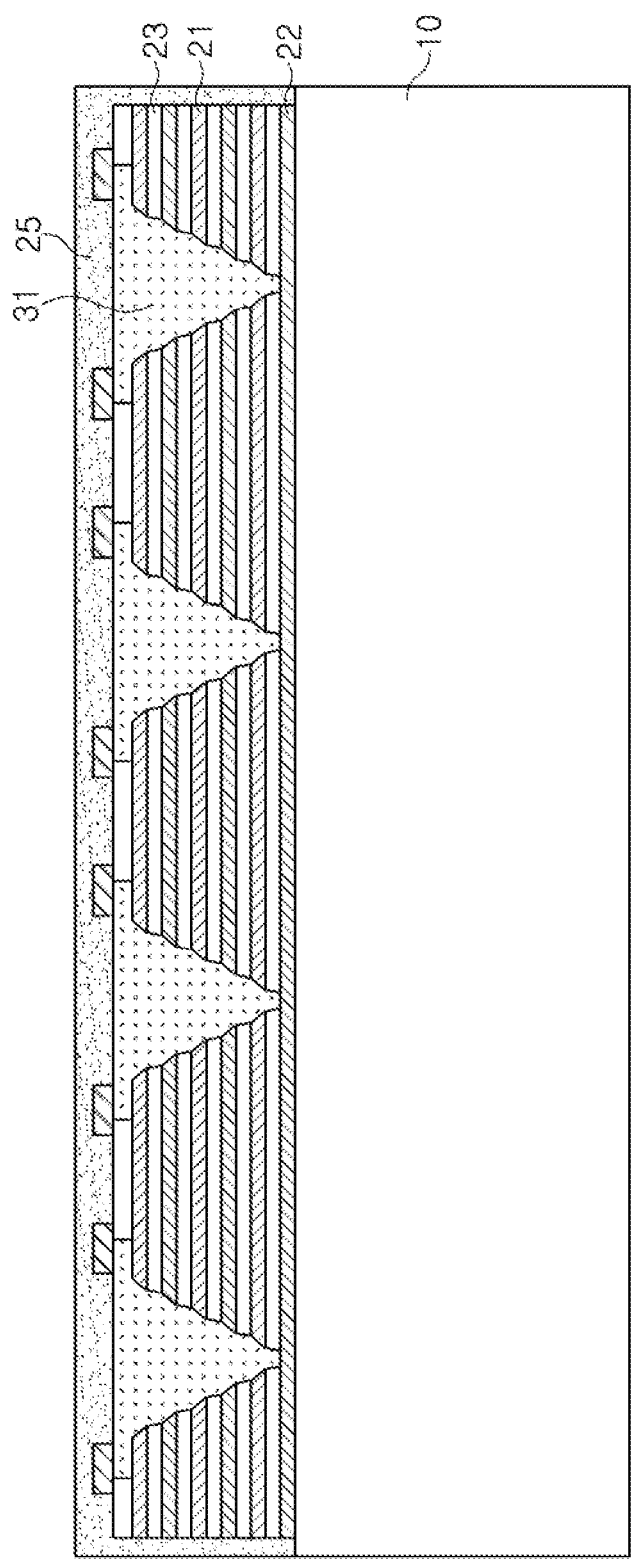
FIG. 3 is a cross-sectional view taken along line I-I' of FIG. 2.

FIG. 3 is a cross-sectional view taken along line I-I' of FIG. 2.

Referring to FIGS. 1 through 3, a thin-film ceramic capacitor 100 according to exemplary embodiments of the present disclosure may include a body 20 formed by alternately stacking first and second electrode layers 21 and 22 and dielectric layers 23 on a substrate 10; and a plurality of vias 31 and 32 disposed in the body 20, wherein among the plurality of vias, a first via 31 is electrically connected to the first electrode layer 21, and among the plurality of vias, a second via 32 is electrically connected to the second electrode layer 22. It is to be understood that any 'via' described in this disclosure and/or the associated claims can also be termed an 'aperture.'

Further, the thin-film ceramic capacitor 100 according to exemplary embodiments of the present disclosure may include first and second electrode pads 51 and 52 disposed on an external surface of the body 20 not overlapping the first and second vias 31 and 32 in a stacking direction, respectively, a first connection electrode 41 disposed on the external surface of the body 20 and connecting the first electrode pad 51 and the first via 31 to each other, and a second connection electrode 42 disposed on an external surface of the body 20 and connecting the second electrode pad 52 and the second via 32 to each other.

Therefore, among the plurality of vias, the first via 31 may electrically connect the first electrode layer 21 and the first electrode pad 51 to each other, and among the plurality of vias, the second via 32 may electrically connect the second electrode layer 22 and the second electrode pad 52 to each other.

According to exemplary embodiments of the present disclosure, a 'length direction' of the thin-film ceramic capacitor refers to an 'L' direction of FIG. 1, a 'width direction' thereof refers to a 'W' direction of FIG. 1, and a 'thickness direction' thereof refers to a 'T' direction of FIG. 1. The 'thickness direction' is the same as a direction in which dielectric layers and the electrode layers are stacked, that is, the 'stacking direction'.

A shape of the body 20 is not particularly limited, but generally, may be a hexahedral shape. Further, the body 20 is not particularly limited in view of dimensions, but may have, for example, a size of 0.6 mm×0.3 mm and may be a highly stacked and high-capacitance thin-film ceramic capacitor of 1.0 µF or more.

The substrate 10 may be a layer (substrate) contacting the first and second electrode layers 21 and 22 and having an insulation property, and be formed of one selected from $Al_2O_3$, $SiO_2/Si$, MgO, $LaAlO_3$, and $SrTiO_3$, but is not limited thereto. The substrate 10 may have sufficient flatness and surface roughness.

Figure 4A:
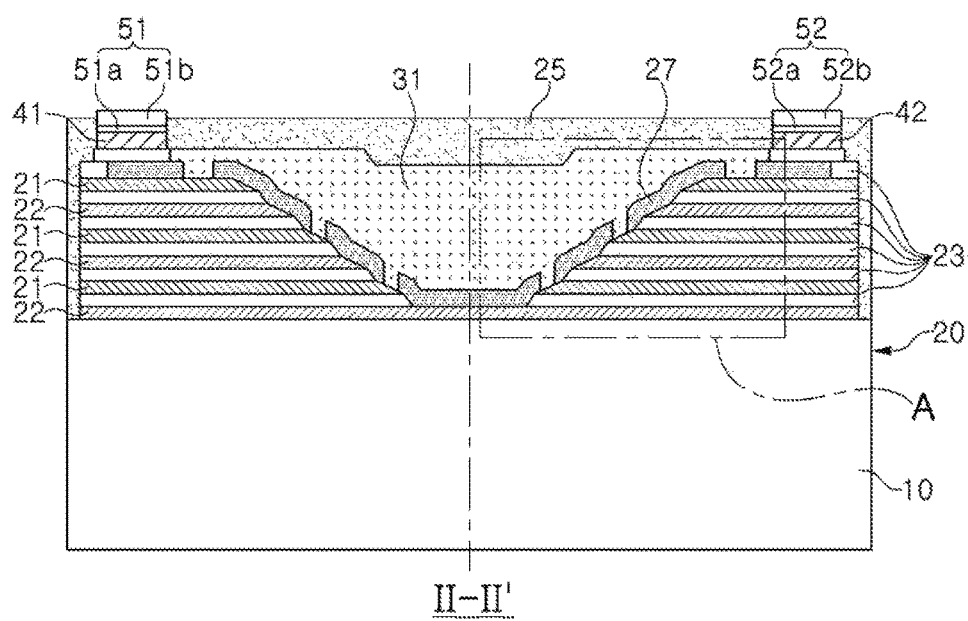
FIG. 4A is a cross-sectional view taken along line II-II' of FIG. 2.
Figure 4B:
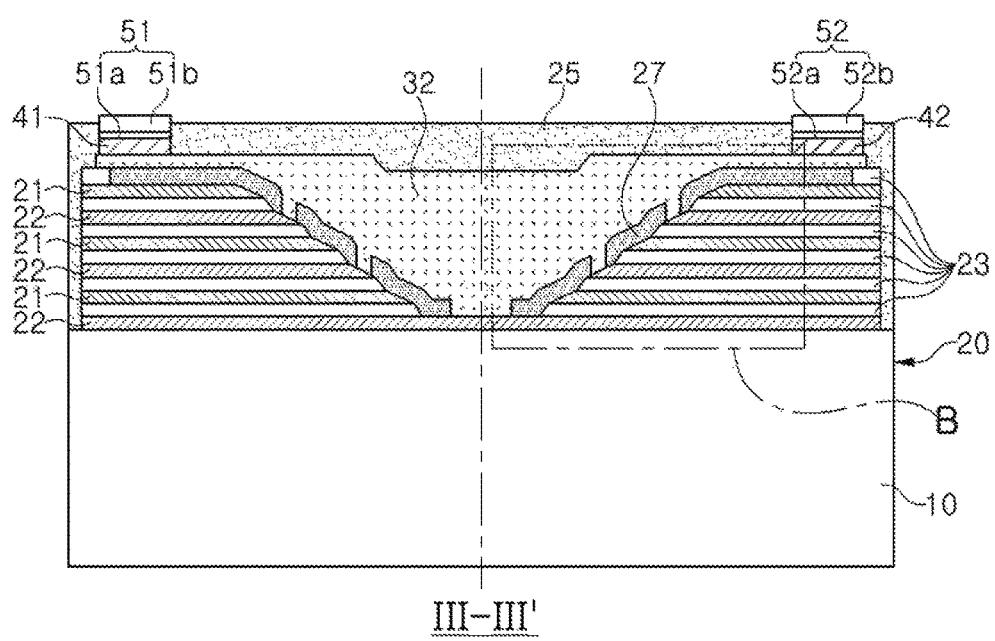
FIG. 4B is a cross-sectional view taken along line III-III' of FIG. 2.

FIG. 4A is a cross-sectional view taken along line II-II' of FIG. 1, and FIG. 4B is a cross-sectional view taken along line III-III' of FIG. 1.

Referring to FIGS. 4A and 4B, in the body 20 having a stacking structure in which the second electrode layer 22 is formed on the substrate 10, the dielectric layer 23 is formed on the second electrode layer 22, and the first electrode layer 21 is formed on the dielectric layer 23, the plurality of first and second electrode layers 21 and 22 may be alternately stacked with respective dielectric layers 23 interposed therebetween. Here, the numbers of stacked dielectric layers 23 and first and second electrode layers 21 and 22 are not limited to those in the accompanying drawing.

The body 20 may be formed by stacking the dielectric layers 23 and the first and second electrode layers 21 and 22 to be alternately disposed on the substrate 10.

In more detail, the body 20 may be formed by stacking the plurality of dielectric layers 23 in the thickness direction and stacking the first and second electrode layers 21 and 22 simultaneously in a vacuum state so as to be alternately disposed with respective dielectric layers 23 interposed therebetween.

According to exemplary embodiments of the present disclosure, portions of the plurality of dielectric layers 23 and first and second electrode layers 21 and 22 exposed to the plurality of vias may have inclined surfaces by performing interlayer etching while changing an etching area in order to selectively connect internal electrodes of the thin-film ceramic capacitor stacked simultaneously in the vacuum state.

Further, inclined etched surfaces of the dielectric layers 23 and the first and second electrode layers 21 and 22 may be exposed to the plurality of vias, and electrical connections may be blocked by forming an insulating layer on an electrode layer requiring insulation among the exposed first and second electrode layers.

Next, after exposing only an electrode to be connected, a seed layer is formed using an electro-less plating method or sputtering method, and then, an electrode connection layer may be formed by filling a conductive metal using a plating method.

Therefore, interlayer electrical connection of the internal electrodes may be implemented by one via.

According to exemplary embodiments of the present disclosure, since the thin-film ceramic capacitor is manufactured by stacking the dielectric layers 23 and the first and second electrode layers 21 and 22 simultaneously in the vacuum state, a damage occurring at the time of exposure to an external environment may be significantly decreased.

As the numbers of stacked first and second electrode layers 21 and 22 and dielectric layers 23 are increased, equivalent series resistance (ESR) of the capacitor may be decreased.

Each of the first and second electrode layers 21 and 22 may be formed as a single layer without a predetermined pattern.

The first and second electrode layers 21 and 22 may be formed of a conductive material.

The conductive material may be copper (Cu), aluminum (Al), gold (Au), silver (Ag), platinum (Pt), iridium (Ir), ruthenium (Ru), or the like, but is not limited thereto.

Formation of the dielectric layer corresponding to a thin film having high permittivity may be accompanied by high-temperature thermal history. Therefore, a problem in which a leakage current is increased in the capacitor may occur due to diffusion of the electrode layer to the dielectric layer or a reaction between the electrode layer and the dielectric layer.

The first and second electrode layers 21 and 22 may be formed of platinum (Pt), which is a material having a high melting point, such that diffusion to the dielectric layer or the reaction with the dielectric layer may be decreased.

The dielectric layer 23 may contain a perovskite material as a material having high permittivity.

The perovskite material may be a dielectric material of which permittivity may be significantly changed, for example, a barium titanate ($BaTiO_3$)-based material, a strontium titanate ($SrTiO_3$)-based material, a $(Ba,Sr)TiO_3$-based material, a lead zirconate titanate (PZT)-based material, or the like, but is not limited thereto.

The first via 31 may be electrically connected to the first electrode layer 21, the second via 32 may be electrically connected to the second electrode layer 22, and the first and second vias 31 and 32 may be electrically insulated from each other.

The first and second vias 31 and 32 may be formed of a conductive material, and be formed by a plating method. Therefore, depressed portions (dimples) may be formed in upper surfaces of the first and second vias.

The conductive material may be copper (Cu), aluminum (Al), gold (Au), silver (Ag), platinum (Pt), or the like, but is not limited thereto.

The first and second vias 31 and 32 may be formed in plural. When the first and second vias are formed in plural, contact surfaces of the first and second vias contacting the first and second electrode layers, respectively, may be increased, such that equivalent series resistance (ESR) of the capacitor may be decreased.

Referring to FIGS. 1 through 4B, the first and second connection electrodes 41 and 42 may be formed to connect the first and second vias 31 and 32 to the first and second electrode pads 51 and 52 to each other, respectively.

The first and second connection electrodes 41 and 42 may be formed of a conductive material, and be formed using a plating method.

The conductive material may be copper (Cu), aluminum (Al), gold (Au), silver (Ag), platinum (Pt), or the like, but is not limited thereto.

The first and second electrode pads 51 and 52 may be formed on an upper surface of the body 20, and connected to the first and second electrode layers 21 and 22 through the plurality of vias 31 and 32 exposed to one surface of the body 20 to thereby be electrically connected thereto.

The first and second electrode pads 51 and 52 as described above may be formed on the upper surface of the body 20 by a thin film formation method such as a sputtering method or e-beam deposition method.

The first and second electrode pads 51 and 52 may contain a conductive material.

The conductive material may be copper (Cu), aluminum (Al), gold (Au), silver (Ag), platinum (Pt), or the like, but is not limited thereto.

The first and second electrode pads 51 and 52 may include seed layers 51a and 52a and electrode layers 51b and 52b formed from the seed layers, respectively.

The first and second electrode pads 51 and 52 may be disposed not to overlap the first and second vias, respectively, in the stacking direction of the dielectric layers and the electrode layers, but are not limited thereto. That is, the first and second electrode pads 51 and 52 may also be disposed to overlap the first and second vias, respectively.

The first and second electrode pads 51 and 52 may be integrated with the first and second connection electrodes, respectively. Alternatively, the first and second electrode pads 51 and 52 may be disposed on the first and second connection electrodes, respectively.

The first and second connection electrodes 41 and 42 may have a comb shape due to disposition of the first and second vias 31 and 32. The first and second connection electrodes having the comb shape may be alternately disposed to be engaged with each other.

In detail, the first connection electrode 41 may include a plurality of first connection portions connected to the plurality of first vias, respectively, and a first electrode portion connected to the plurality of first connection portions, and the second connection electrode 42 may include a plurality of second connection portions connected to the plurality of second vias, respectively, and a second electrode portion connected to the plurality of second connection portions.

Since the first and second connection electrodes also have different polarities from each other, the smaller the interval between the first and second connection electrodes, the better the effect of decreasing equivalent series inductance (ESL).

The plurality of first and second connection portions may have shapes of branches extended from the plurality of first and second vias, respectively.

An insulating layer 27 may be formed in order to allow the first and second vias 31 and 32 to be electrically connected to the first and second electrode layers 21 and 22, respectively.

The insulating layer 27 may be formed between the first via 31 and the dielectric layer 23 and the second electrode layer 22, and between the second via 32 and the dielectric layer 23 and the first electrode layer 21.

That is, the insulating layer may secure insulation between the first via and the second electrode layer and insulation between the second via and the first electrode layer, and be formed on a surface of the dielectric layer, thereby decreasing parasitic capacitance formed therein.

The insulating layer 27 may use an organic material such as benzocyclobutene (BCB), polyimide, or the like, or an inorganic material such as $SiO_2$, $Si_3N_4$, or the like, and the insulating layer 50 may be formed of a material having lower permittivity than that of the material of the dielectric layer in order to increase insulation properties and decrease parasitic capacitance.

The insulating layer may be formed by a chemical vapor deposition (CVD) method capable of forming a uniform film thickness on a complex three dimensional shape.

A protection layer 25 may be formed in order to prevent the body 20 and the first and second connection electrodes 41 and 42 from degradation or contamination of materials caused by humidity from the outside and a chemical reaction with oxygen, and damages at the time of mounting.

The protection layer 25 may be formed of a material having high thermal resistance. For example, the protection layer 25 may be formed of an organic thermosetting material or photocurable material such as polyimide.

Referring to FIGS. 4A and 4B, the dielectric layer 23 and the first and second electrode layers 21 and 22 in the body 20 may have the inclined etched surfaces exposed to the plurality of vias 31 and 32.

Among the plurality of vias 31 and 32, the first via 31 may connect the first electrode layers 21 and the first electrode pad 51 to each other and penetrate from one surface of the body 20 to a lowermost first electrode layer 21 proximate the substrate 10, and among the plurality of vias 31 and 32, the second via 31 may connect the second electrode layers 22 and the second electrode pad 52 to each other and penetrate from one surface of the body 20 to a lowermost second electrode layer 22 proximate the substrate 10.

An upper surface of the first electrode layer 21 in the first via 31 and an upper surface of the second electrode layer 22 in the second via 32 may be exposed to thereby be connected to the first and second electrode pads 51 and 52, respectively.

According to exemplary embodiments of the present disclosure, widths of the plurality of vias 31 and 32 may be increased in a direction from the substrate 10 to an upper portion of the body 20.

The first and second vias 31 and 32 may be manufactured so that the widths thereof are increased in the direction from the substrate 10 to the upper portion of the body 20, such that the first via 31 may be connected to all of the first electrode layers 21 disposed in the body 20, and the second via 32 may be connected to all of the second electrode layers 22 disposed in the body 20.

Since in the first via 31, etching is performed up to a layer to which the first internal electrode 21 is exposed, and the width of the first via is increased in the direction from the substrate to the upper portion of the body 20, after the insulating is performed, the insulating layer 27 may be disposed on etched surfaces of the dielectric layer 23 and the second electrode layer 22, and only an inclined side surface of the first electrode layer 21 may be exposed.

Therefore, all of the first electrode layers 21 may be electrically connected to the first via 31, and electrically connected to the first electrode pad 51 through the first via 31.

Meanwhile, since the second via 32 is formed by performing the etching up to a layer to which the second internal electrode 22 is exposed, and the width thereof is increased in the direction from the substrate 10 to the upper portion of the body 20, after the insulating is performed, the insulating layer 27 may be disposed on etched surfaces of the dielectric layer 23 and the first electrode layer 21, and only an inclined side surface of the second electrode layer 22 may be exposed.

Therefore, all of the second electrode layers 22 may be electrically connected to the second via 32, and electrically connected to the second electrode pad 52 through the second via 32.

Further, the insulating layer 27 may be disposed on the second electrode layer 22 exposed in the first via 31 and the first electrode layer 21 exposed in the second via 32.

In detail, the insulating layer 27 may be disposed on etched surfaces of the second electrode layer 22 exposed in the first via 31 and the first electrode layer 21 exposed in the second via 32.

According to exemplary embodiments of the present disclosure, since the first via 31 is connected to all of the first electrode layers 21 and the second via 32 is connected to all of the second electrode layers 22, even in a case in which one or two or more internal electrodes are not connected to the via due to a process deviation, there is no problem in forming capacitance.

That is, in a structure in which one via is connected with respect to one internal electrode as in the related art, when the connection is failed, capacitance is not formed, and as a result, capacitance of a capacitor may be decreased.

However, according to exemplary embodiments of the present disclosure, since the first via 31 is connected to all of the first electrode layers 21 and the second via 32 is connected to all of the second electrode layers 22, even though some of the internal electrodes are not connected to the via, there is no problem in forming capacitance, such that reliability may be excellent.

The number of the first via 31 may be one or two or more, and when the number of the first via is two or more, the plurality of the first vias 31 may have the same depth as each other. In addition, the number of the second via 32 may be one or two or more, and when the number of the second via is two or more, the plurality of the second vias 32 may have the same depth as each other.

Figure 5A:
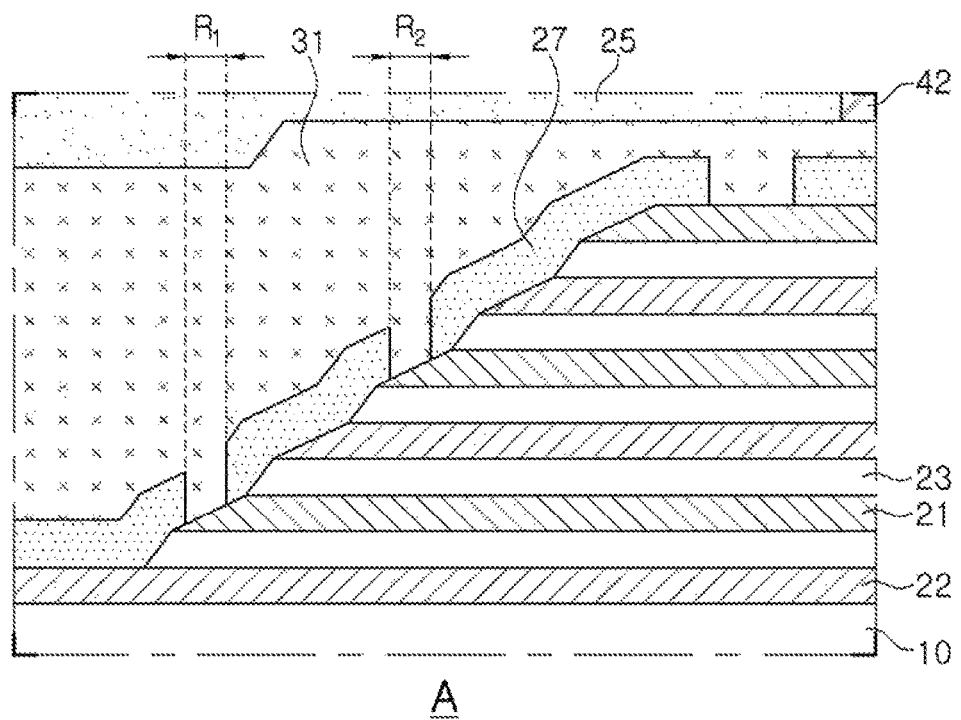
FIG. 5A is an enlarged view of portion A of FIG. 4A.
Figure 5B:
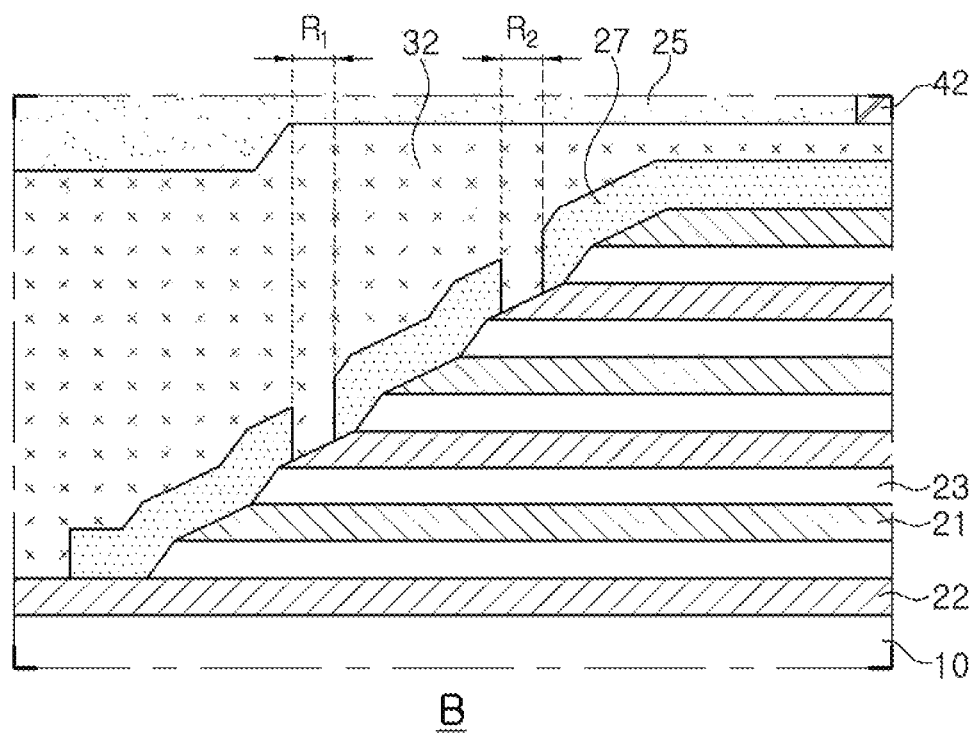
FIG. 5B is an enlarged view of portion B of FIG. 4B.

FIG. 5A is an enlarged view of portion A of FIG. 4A, and FIG. 5B is an enlarged view of portion B of FIG. 4B.

Referring to FIGS. 5A and 5B, in the thin-film ceramic capacitor according to exemplary embodiments of the present disclosure, the plurality of dielectric layers 23 and the first and second electrode layers 21 and 22 may have the inclined etched surfaces exposed to the plurality of vias 31 and 32. Among the plurality of vias, the first via 31 may be connected to the inclined surface of the first electrode layer 21, and among the plurality of vias, the second via 32 may be connected to the inclined surface of the second electrode layer 22.

In general, at the time of manufacturing a thin-film ceramic capacitor, after forming a plurality of dielectric layers and electrodes, there is a need to form and connect vias in order to connect upper and lower electrodes to each other.

In this case, when an area of the via is increased, capacitance of the dielectric layer is decreased in accordance with the increase in the area of the via, and as a size of the via is increased, a problem such as a limitation in design, for example, disposition of the electrodes, or the like, may occur.

Further, according to known technologies, in order to connect vias in respective layers to each other, the etching should be performed several times up to an electrode layer to be required, such that process costs may be increased.

However, according to exemplary embodiments of the present disclosure, the plurality of dielectric layers 23 and first and second electrode layers 21 and 22 may have the inclined etched surfaces exposed to the plurality of vias 31 and 32 by stacking the dielectric layers and the electrode layers simultaneously and then simultaneously etching the stacked dielectric layers and electrode layers to form vias having a multistep shape.

Further, among the plurality of vias, the first via 31 may be connected to the inclined surface of the first electrode layer 21, and the second via 32 may be connected to the inclined surface of the second electrode layer 22.

As described above, the vias may be formed through one-time etching by stacking the dielectric layers and the electrode layers simultaneously and then simultaneously etching the stacked dielectric layers and electrode layers to form the vias having the multistep shape, such that process operations may be decreased and thus cost may be decreased.

Further, since the via is formed by a simultaneous etching method, an alignment error in respective layers between processes does not occur, such that a defect rate of a product may be decreased.

In addition, a size of the via may be decreased, such that a high-capacitance thin-film ceramic capacitor may be implemented, and a limitation in design such as disposition of electrodes may be decreased.

Among the second electrode layers 22 exposed in the second via 32, an upper surface of the lowermost second electrode layer 22 may be exposed.

Among the second electrode layers 22 exposed in the second via 32, in the lowermost second electrode layer 22, which is the last layer subject to the etching, the upper surface thereof may be exposed rather than the side surface thereof.

Among the first electrode layers 21 exposed in the first via 31, an upper surface of an uppermost first electrode layer 21 may be exposed.

Among the first electrode layers 21 exposed in the first via 31, in the uppermost first electrode layer 21, which is the first layer subject to the etching, the upper surface thereof rather than the side surface thereof may be exposed.

According to exemplary embodiments of the present disclosure, lengths R1 and R2 of the inclined etched surfaces of the first and second electrode layers 21 and 22 may be increased upwardly from the lowermost electrode layers proximate the substrate.

That is, among the lengths of the inclined etched surfaces of the first electrode layers 21, a length R2 of an etched surface of a first electrode layer 21 positioned on the lowermost first electrode layer 21 proximate the substrate may be longer than a length R1 of the etched surface of the lowermost first electrode layer 21.

Further, since the upper surface of the lowermost second electrode layer 22 proximate the substrate is exposed, among the lengths of the inclined etched surfaces of the second electrode layers 22, a length R2 of an etched surface of a second electrode layer 22 which is the second closest to the lowermost second electrode layer 22 may be longer than a length R1 of the inclined etched surface of a second electrode layer 21 which is the closest to the uppermost second electrode layer 22.

In other words, contact areas between the first and second electrode layers 21 and 22 and the first and second vias 31 and 32 may be increased upwardly from the lowermost layers proximate the substrate.

Since the lengths R1 and R2 of the inclined etched surfaces of the first and second electrode layers 21 and 22 are increased upwardly from the lowermost layers proximate the substrate, the vias and the electrode layers may be more clearly connected to each other, such that the high-capacitance thin-film ceramic capacitor may be implemented.

Further, the contact area of the first and second vias 31 and 32 contacting the first and second electrode layers 21 and 22, respectively, may be increased, such that ESR of the capacitor may be decreased.

In detail, according to exemplary embodiments of the present disclosure, as illustrated in FIG. 5A, the length R1 of the inclined etched surface of the lowermost first electrode layer 21 is measured as 1.65 μm, and a length R2 of the inclined etched surface of the first electrode layer 21 positioned thereon is measured as 2.48 μm. Therefore, it may be appreciated that the length of the inclined etched surface of the first electrode layer is increased upwardly from the lowermost first electrode layer proximate the substrate.

Similarly, according to exemplary embodiments of the present disclosure, as illustrated in FIG. 5B, the length R1 of the inclined etched surface of the second electrode layer 22 which is the closest to the lowermost second electrode is measured as 1.70 μm, and the length R2 of the inclined etched surface of the second electrode layer 22 positioned thereon is measured as 4.02 μm. Therefore, it may be appreciated that the length of the inclined etched surface of the second electrode layer is increased upwardly from the lowermost second electrode layer proximate the substrate.

Further, according to exemplary embodiments of the present disclosure, the plurality of dielectric layers 23 may also have the inclined etched surfaces, and a length of the inclined etched surface of the dielectric layer 23 may also be increased upwardly from a lowermost dielectric layer.

According to exemplary embodiments of the present disclosure, lengths of inclined etched surfaces of the lowermost dielectric layer 23, the second lowermost dielectric layer 23, the third lowermost dielectric layer 23, and the fourth lowermost dielectric layer 23 are measured as 0.63 μm, 0.67 μm, 0.82 μm, and 1.17 μm, respectively, and it may be appreciated that the length of the inclined etched surface of the dielectric layer 23 is increased upwardly from the lowermost dielectric layer.

According to exemplary embodiments of the present disclosure, the inclined etched surfaces of the plurality of dielectric layers 23 and the first and second electrode layers 21 and 22 may be formed by the one-time etching.

Since the vias are formed by the simultaneous etching, process operations may be decreased, such that costs may be decreased, and the alignment error between the processes may be reduced or may not occur, such that the defect rate of the product may be decreased.

In addition, the size of the via may be decreased, such that the high-capacitance thin-film ceramic capacitor may be implemented, and a limitation in design such as disposition of electrodes may be decreased.

Hereinafter, various examples for manufacturing the thin-film ceramic capacitor according to exemplary embodiments of the present disclosure will be described, but a method of manufacturing the thin-film ceramic capacitor is not limited thereto.

Figure 6A:
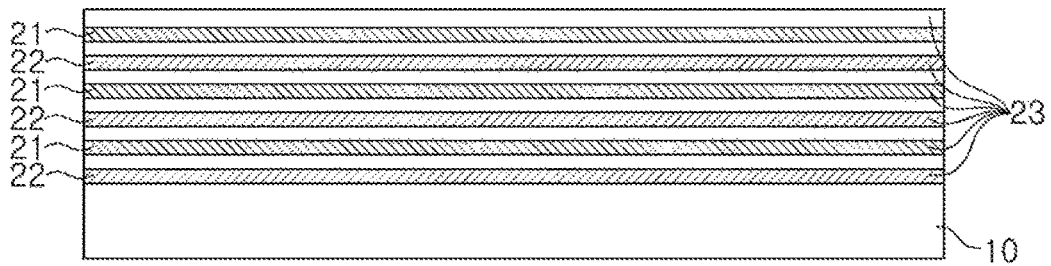
FIGS. 6A and 6B are views illustrating processes of manufacturing vias in thin-film ceramic capacitors according to exemplary embodiments of the present disclosure.
Figure 6B:
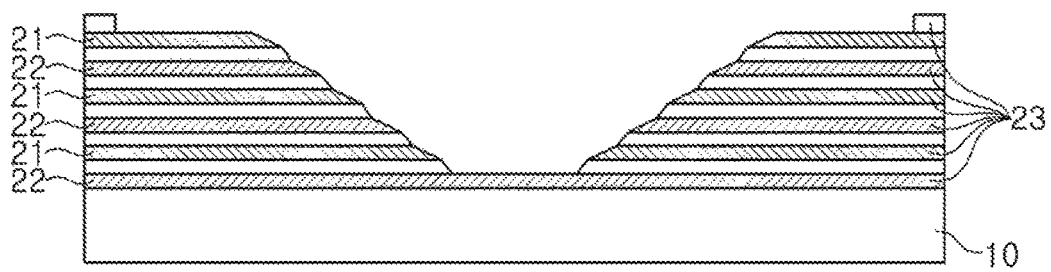

FIGS. 6A and 6B are views illustrating processes of manufacturing vias in a thin-film ceramic capacitor according to exemplary embodiments of the present disclosure.

Hereinafter, methods of manufacturing vias in the thin-film ceramic capacitor will be described with reference to FIGS. 6A and 6B.

Referring to FIG. 6A, a laminate may be prepared by stacking the dielectric layers 23 and the first and second electrode layers 21 and 22 to be alternately disposed on the substrate 10.

The substrate 10 is not particularly limited. For example, the substrate may be formed of a prepreg material.

The dielectric layer 23 may be formed by depositing a perovskite-based dielectric material such as barium titanate ($BaTiO_3$) on the substrate 10, the first electrode layer 21 may be formed on the dielectric layer 23 by depositing a conductive metal using a thin-film formation method such as a sputtering method, an e-beam deposition method, or the like, and the dielectric layer 23 and the second electrode layer 22 may be formed thereon again.

Therefore, the plurality of first and second electrode layers 21 and 22 may be formed to be alternately stacked through both end surfaces of the dielectric layers 23 opposing each other.

The stacking of the dielectric layers 23 and the first and second electrode layers 21 and 22 may be performed by a deposition method, but is not limited thereto. That is, the stacking may also be performed by a chemical solution deposition method.

The dielectric layers 23 and the first and second electrode layers 21 and 22 may be stacked simultaneously in a vacuum state without a separate patterning process.

However, the stacking of the dielectric layers 23 and the first and second electrode layers 21 and 22 is not limited thereto, but the dielectric layers 23 and the first and second electrode layers 21 and 22 may also be stacked simultaneously in a non-vacuum state.

Referring to FIG. 6B, in order to expose interlayer electrodes disposed in the laminate, a photoresist (not illustrated) may be applied on an upper surface of the laminate, and the photoresist may be patterned by an exposure and development method.

Next, vias may be formed by performing the etching up to a predetermined electrode layer.

According to the related art, since in order to connect vias in respective layers to each other, the etching should be performed several times up to an electrode layer to be required, such that process operations are increased and process costs are increased. However, according to exemplary embodiments of the present disclosure, since the via may be formed up to a predetermined electrode layer by one-time etching, process costs may be decreased.

Since the via is formed up to the predetermined electrode layer by one-time etching, the etched surfaces of the plurality of dielectric layers 23 and first and second electrode layers 21 and 22 may be inclined.

Next, the patterned photoresist may be removed.

Therefore, the plurality of vias may be formed as illustrated in FIG. 6B so that a width of each of the vias is decreased upwardly from the substrate, and the etched surfaces of the plurality of dielectric layers 23 and first and second electrode layers 21 and 22 are inclined.

FIGS. 7A through 7D are views illustrating processes of manufacturing an insulating layer in vias in a thin-film ceramic capacitor according to exemplary embodiments of the present disclosure.

FIGS. 7A to 7D illustrate a method of patterning the insulating layer in order to selectively connect exposed electrodes to each other.

That is, a first via is connected to a first electrode layer and simultaneously insulated from an exposed second electrode layer, and a second via is connected to a second electrode layer and simultaneously insulated from an exposed first electrode layer.

Therefore, there is a need to block an electrical connection of the second electrode layer in the first via and block electrical connection of the first electrode layer in the second via using a dielectric layer or insulating layer.

Figure 7A:
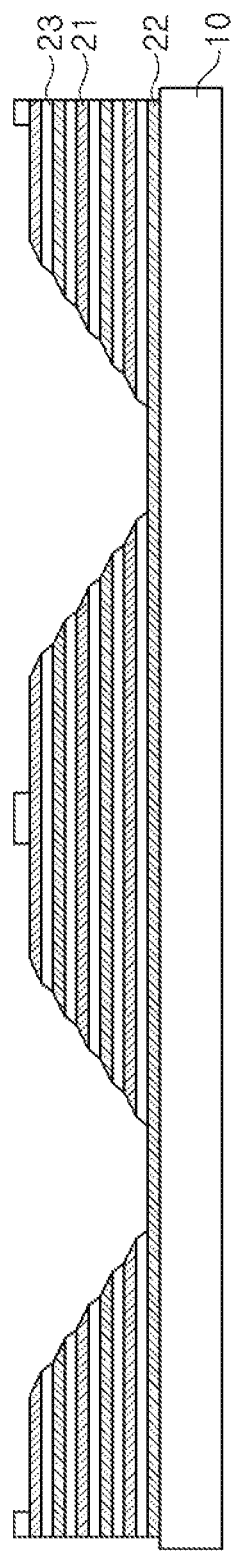
FIGS. 7A through 7D are views illustrating processes of manufacturing an insulating layer in vias in a thin-film ceramic capacitor according to exemplary embodiments of the present disclosure.

FIG. 7A illustrates a cross section of a laminate in which first and second vias are formed through the processes of FIGS. 6A and 6B.

The first via may penetrate from one surface of the laminate to a lowermost first electrode layer proximate a substrate 10, and the second via may penetrate from one surface of the laminate to a lowermost second electrode layer proximate the substrate 10.

According to exemplary embodiments, widths of the first and second vias may be increased in a direction from the substrate 10 to an upper portion of the laminate.

The first via may be connected to all of the first electrode layers and the second via may be connected to all of the second electrode layers by forming the first and second vias so that the widths thereof are increased from the substrate 10 to the upper portion of the laminate.

Figure 7B:
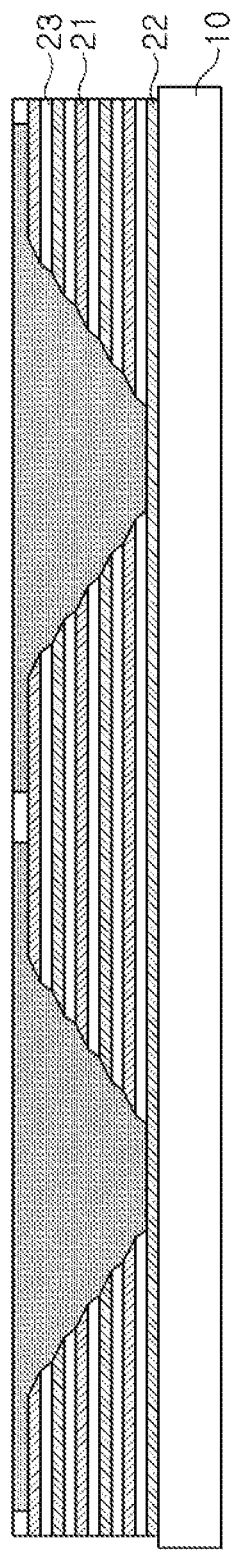

Referring to FIG. 7B, after the plurality of vias are formed in the laminate, an insulating material may be applied on the substrate 10.

Figure 7C:
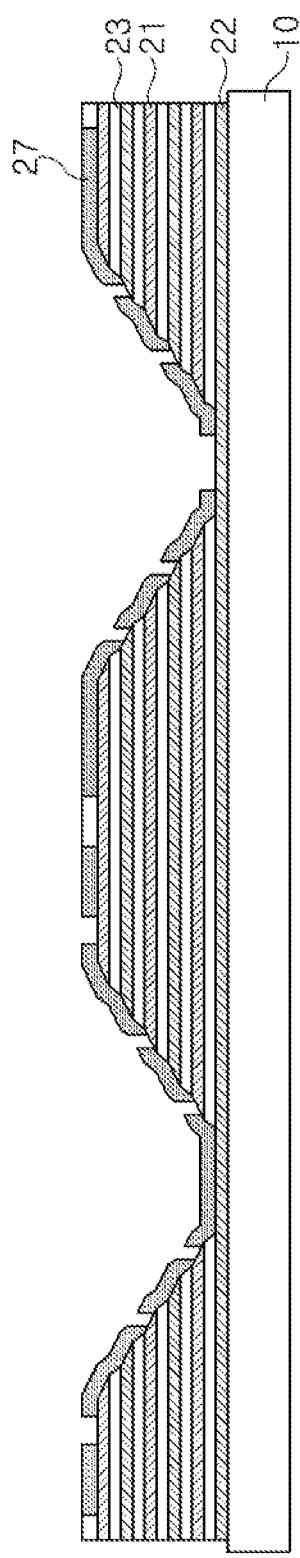

Referring to FIG. 7C, an insulating layer 27 may be formed on etched surfaces of the dielectric layers 23 and the first and second electrode layers 21 and 22 in the plurality of vias 31 and 32 by etching the insulating material.

Since the width of the first via 31 is increased in the direction from the substrate 10 to the upper portion of the laminate, after the insulating is performed, the insulating layer 27 may be disposed on the etched surfaces of the dielectric layer 23 and the second electrode layer 22, and only an inclined side surface of the first electrode layer 21 may be exposed.

In addition, since the width of the second via 32 is increased in the direction from the substrate 10 to the upper portion of the laminate, after the insulating is completed, the insulating layer 27 may be disposed on the etched surfaces of the dielectric layer 23 and the first electrode layer 21, and only an inclined side surface of the second electrode layer 22 may be exposed.

According to exemplary embodiments of the present disclosure, any one of the first vias 31 may be connected to all of the first electrode layers 21 disposed in the laminate, and any one of the second vias 32 may be connected to all of the second electrode layers 22 disposed in the laminate.

The number of the first via 31 units may be two or more, and among the plurality of the first via 31 units, vias having the same shape may have the same depth as each other, although the present disclosure is not limited thereto. In addition, the number of the second via 32 units may also be two or more, and among the plurality of the second via 32 units, vias having the same shape may have the same depth as each other, although the present disclosure is not limited thereto.

However, the first via (31) unit and the second via (32) unit are not limited thereto, but the number of each of the first via (31) unit and second via (32) unit may be one.

Figure 7D:
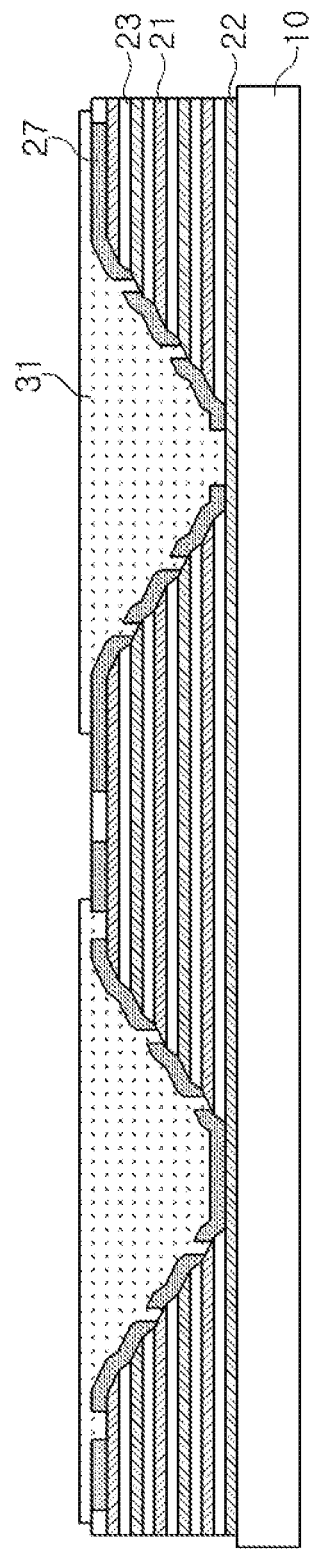

Referring to FIG. 7D, a conductive metal may be filled in the first and second vias 31 and 32.

A method of filling the conductive metal in the first and second vias 31 and 32 may be performed by forming a seed layer on a surface of each of the exposed electrode layers and filling the conductive metal by a plating method so as to connect the electrode layers and external electrodes to each other.

As set forth above, according to exemplary embodiments in the present disclosure, after the dielectric layers and electrodes are stacked simultaneously, the electrodes may be electrically connected to each other by the via having the multistep shape, such that damages caused by external environments at the time of depositing a thin film may be significantly decreased, and a small-sized product having a thinner thickness may be implemented.

Further, since the via is formed by the simultaneous etching method, process operations may be decreased, such that costs may be decreased.

Further, since the via is formed by the simultaneous etching method, an alignment error between processes may not occur, such that a defect rate of the product may be decreased.

In addition, the size of the via may be decreased, such that the high-capacitance thin-film ceramic capacitor may be implemented, and a limitation in design such as disposition of electrodes may be decreased.

While exemplary embodiments have been shown and described above, it will be apparent to those skilled in the art that modifications and variations could be made without departing from the scope of the present invention as defined by the appended claims.

What is claimed is:

1. A thin-film ceramic capacitor, comprising:
a body comprising a substrate and a plurality of dielectric layers and first and second electrode layers alternately disposed on the substrate in the body;
first and second electrode pads disposed on one external surface of the body; and
a plurality of vias disposed in the body and each extending from the same one external surface of the body to the plurality of dielectric layers and a respective one of the first and second electrode layers,
the plurality of dielectric layers and first and second electrode layers having inclined etched surfaces exposed to the plurality of vias,
a first via, of the plurality of vias, extending from the one external surface of the body and being connected to the inclined surface of the first electrode layer, and
a second via, of the plurality of vias, extending from the one external surface of the body and being connected to the inclined surface of the second electrode layer.

2. The thin-film ceramic capacitor of claim 1, wherein the first via, of the plurality of vias, connects the first electrode layer and the first electrode pad to each other, and the first via penetrates from the one external surface of the body to a lowermost first electrode layer proximate the substrate.

3. The thin-film ceramic capacitor of claim 2, wherein the second via, of the plurality of vias, connects the second electrode layer and the second electrode pad to each other and penetrates from the one external surface of the body to a lowermost second electrode layer proximate the substrate.

4. The thin-film ceramic capacitor of claim 1, wherein the body includes a plurality of second electrode layers each exposed in the second via, and a lowermost second electrode layer has an upper surface, different from any inclined surface thereof, contacting the second via.

5. The thin-film ceramic capacitor of claim 1, wherein the body includes a plurality of first electrode layers each exposed in the first via, and an uppermost first electrode layer has an upper surface, different from any inclined surface thereof, contacting the first via.

6. The thin-film ceramic capacitor of claim 1, wherein lengths of portions of the inclined etched surfaces of the first and second electrode layers contacting the first and second vias, respectively, are increased upwardly from a lowermost electrode layer proximate the substrate.

7. The thin-film ceramic capacitor of claim 1, wherein the first via is connected to each of the first electrode layers disposed in the body.

8. The thin-film ceramic capacitor of claim 7, wherein the second via is connected to each of the second electrode layers disposed in the body.

9. The thin-film ceramic capacitor of claim 1, wherein there are two or more first vias, and each of the first vias has the same depth as the other of the first vias.

10. The thin-film ceramic capacitor of claim 9, wherein there are two or more second vias, and each of the second vias has the same depth as the other of the second vias.

11. The thin-film ceramic capacitor of claim 1, wherein an insulating layer is disposed on a second electrode layer exposed in the first via and a first electrode layer exposed in the second via.

12. The thin-film ceramic capacitor of claim 1, wherein the inclined etched surfaces formed on the plurality of dielectric layers and first and second electrode layers are formed by one-time etching.

13. The thin-film ceramic capacitor of claim 1, wherein in each via of the plurality of vias has a stepped profile in which a width of each step is increased in a direction from the substrate to an upper portion of the body.

* * * * *